(12) United States Patent
Kohli et al.

(10) Patent No.: US 9,413,853 B1
(45) Date of Patent: Aug. 9, 2016

(54) DETECTION AND PREVENTION OF A TRANSACTION LOOP IN A CACHE SERVER

(71) Applicant: Juniper Networks, Inc., Sunnyvale, CA (US)

(72) Inventors: Jaspal Kohli, Sunnyvale, CA (US); Saravanan Purushothaman, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 216 days.

(21) Appl. No.: 13/853,217

(22) Filed: Mar. 29, 2013

(51) Int. Cl.
*G06F 15/16* (2006.01)
*H04L 29/06* (2006.01)

(52) U.S. Cl.
CPC .................................... *H04L 67/42* (2013.01)

(58) Field of Classification Search
CPC ..... H04L 67/06; H04L 67/1095; H04L 67/32; H04L 65/60; H04L 47/762; H04L 12/2807; G06F 3/0619; G06F 11/3051; G06F 11/0751; G06F 11/0766; G06F 11/079; G06F 2201/835; G06F 2209/541; H04N 21/47202; H04N 21/658; H04N 21/23106; H04N 21/442; H04N 21/64738; H04M 15/00; H04M 15/57; H04M 15/63
USPC ................. 709/201–203, 217–219, 229–237; 707/100, 206; 395/445, 680; 379/9, 379/9.02–9.04, 14.01, 15.01, 15.05
See application file for complete search history.

(56) References Cited

U.S. PATENT DOCUMENTS

| | | | |
|---|---|---|---|
| 6,518,994 B1 * | 2/2003 | Johnson ................. | H04N 7/152 348/14.08 |
| 7,143,153 B1 * | 11/2006 | Black .................. | H04L 41/0681 709/220 |
| 7,773,727 B1 * | 8/2010 | Eslambolchi ........... | H04M 3/10 379/112.01 |
| 2005/0198270 A1 * | 9/2005 | Rusche et al. ................. | 709/224 |
| 2012/0159262 A1 * | 6/2012 | Santana da Costa et al. ... | 714/42 |
| 2013/0322444 A1 * | 12/2013 | Ossipov .................. | H04L 45/18 370/392 |

* cited by examiner

*Primary Examiner* — Oscar Louie
*Assistant Examiner* — Da T Ton
(74) *Attorney, Agent, or Firm* — Harrity & Harrity, LLP (57) ABSTRACT

A device receives requests for content, determines requests for a same identifier from the requests for the content, and stores information associated with the determined requests in an object. The object includes a number of the determined requests, and a current time and a start time associated with the determined requests. The device also determines whether the number of the determined requests satisfies a first threshold, and determines whether a difference between the current time and the start time satisfies a second threshold. The device identifies a loop associated with another device when the number of the determined requests satisfies the first threshold and the difference satisfies the second threshold, and provides information associated with the identified loop.

20 Claims, 12 Drawing Sheets

DETECTION AND PREVENTION OF A TRANSACTION LOOP IN A CACHE SERVER

BACKGROUND

A service provider is an entity (e.g., a business or an organization) that sells bandwidth provided by a network (e.g., the Internet, a data network, a telecommunication network, etc.) associated with the service provider. Service providers may include telecommunications companies, data carriers, wireless communications providers, Internet service providers, cable television operators offering high-speed Internet access, etc. The rapid growth in the use of content, such as, for example, video, audio, images, and software downloads, is creating much higher bandwidth demands on service providers, with sharp bandwidth peaks that may be due to suddenly popular content or the occurrence of events.

In order to address such higher bandwidth demands, service providers deploy proxy cache devices, such as, cache servers, in their networks. The cache servers can cache popular content, which enables the service providers to optimize network utilization and to save on the backhaul bandwidth costs. Cache servers are typically implemented at Layer 7, which is the application layer of the Open Systems Interconnection (OSI) model. The cache servers may be associated with network devices (e.g., routers) that interconnect client devices requesting content and origin devices storing the requested content.

If a request is for content that is stored in the cache server, then the cache server provides the content to the client device. If the requested content is not stored in the cache server, then the cache server connects to the origin device and requests the content from the origin device. The cache server provides the content returned by the origin device to the client device, and may cache the content for future use.

However, if the origin device is incorrectly configured to point to the cache server, a request for content stored in the origin device may create a loop between the cache server and the origin device. Thus, one or more transactions (e.g., the request) may loop through the cache server and the origin device. The loop may cause a buildup of outstanding requests at the cache server, which may cause a service disruption due to resource exhaustion in the cache server.

SUMMARY

In some implementations, a method may include receiving, by a device, a plurality of requests for content, and determining, by the device and from the plurality of the requests for the content, requests that include a same identifier. The method may also include storing, by the device, information associated with the determined requests in an object that includes a number of the determined requests, and a current time and a start time associated with the determined requests; and determining, by the device, whether the number of the determined requests satisfies a first threshold. The method may further include determining, by the device, whether a difference between the current time and the start time satisfies a second threshold, identifying, by the device, a loop associated with another device when the number of the determined requests satisfies the first threshold and the difference satisfies the second threshold, and providing, by the device, information associated with the identified loop.

In some implementations, a device may include one or more processors to: receive a plurality of requests for content; determine, from the plurality of the requests for the content, requests that include a same identifier; store information associated with the determined requests in an object that includes a number of the determined requests, and a current time and a start time associated with the determined requests; determine whether the number of the determined requests satisfies a first threshold; determine whether a difference between the current time and the start time satisfies a second threshold; identify a loop associated with another device when the number of the determined requests satisfies the first threshold and the difference satisfies the second threshold; and provide information associated with the identified loop.

In some implementations, a computer-readable medium may store instructions that include one or more instructions that, when executed by a processor of a device, cause the processor to: receive a plurality of requests for content; determine, from the plurality of the requests for the content, requests that include a same identifier; store information associated with the determined requests in an object that includes a number of the determined requests, and a current time and a start time associated with the determined requests; determine whether the number of the determined requests satisfies a first threshold; determine whether a difference between the current time and the start time satisfies a second threshold; identify a loop associated with another device when the number of the determined requests satisfies the first threshold and the difference satisfies the second threshold; and provide information associated with the identified loop.

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

Systems and/or methods described herein may detect and/or prevent transaction loops in a cache server due to an incorrectly configured origin device. The origin device may be incorrectly configured, to point to the cache server, by a domain name system (DNS), a load balancer, network topology, etc. of a network associated with the origin device and the cache server. The systems and/or methods may determine requests for the same identifier (e.g., a hypertext transfer protocol (HTTP) uniform resource locator (URL)), and may store the determined requests in a single object. The systems and/or methods may detect and/or prevent a transaction loop when a number of the determined requests is greater than a threshold and when a response time, associated with the determined requests, is greater than another threshold.

Figure 1:
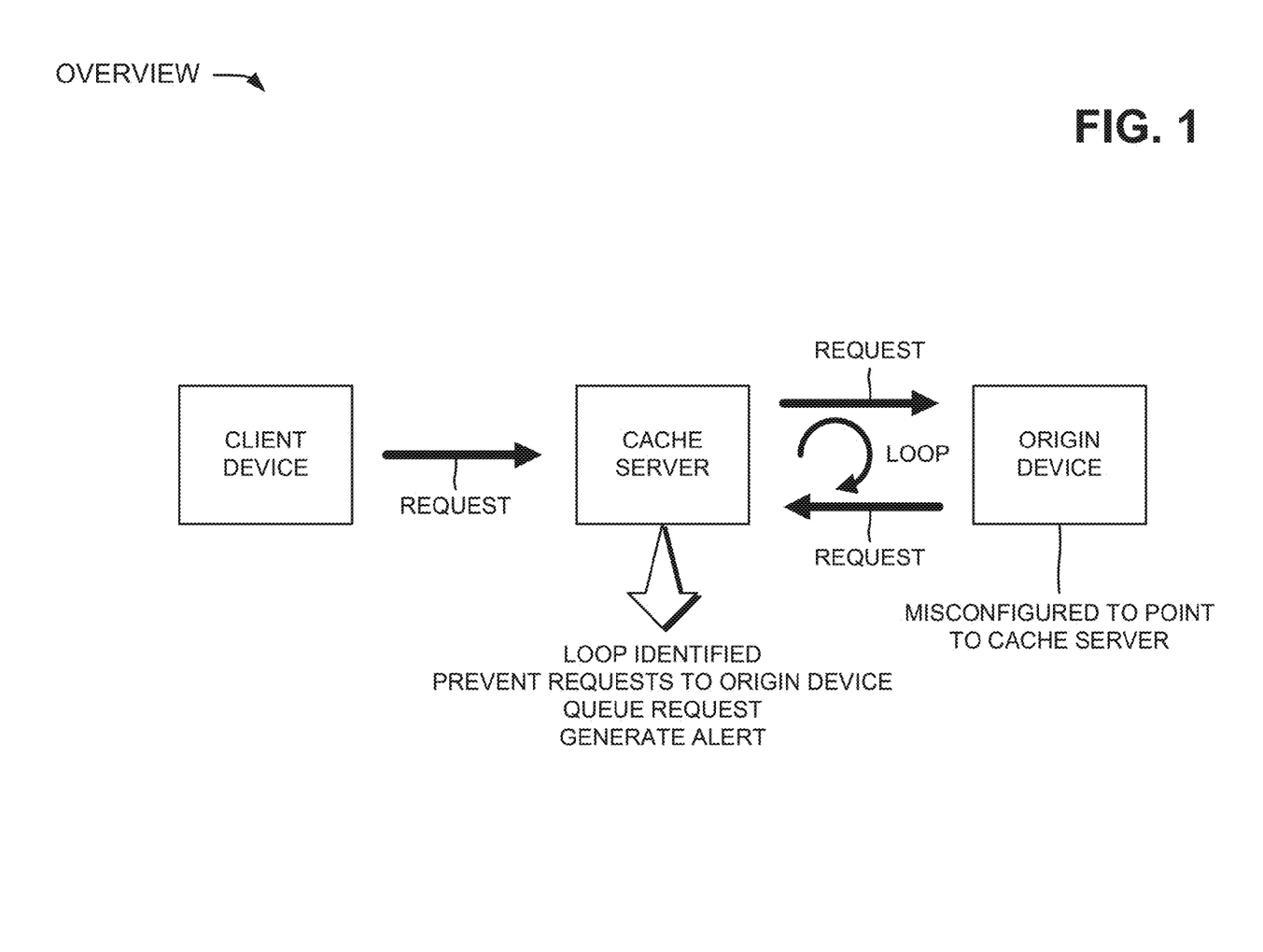
FIG. 1 is a diagram of an overview of an example implementation described herein.

FIG. 1 is a diagram of an overview of an example implementation described herein. For the overview, assume that a client device generates a request for content, and provides the request to a cache server. The request may include a request for content that is stored in an origin device, rather than the cache server. Thus, the cache server may provide the request to the origin device, as further shown in FIG. 1. However, the origin device may be incorrectly configured to point to the cache server, such that the origin device may receive the request and automatically forward the request back to the cache server. The request and the incorrectly configured origin device may create a transaction loop between the cache server and the origin device.

As further shown in FIG. 1, the cache server may receive the request for the content several times. The cache server may determine that the requests for the content include a same identifier (e.g., a HTTP URL associated with the content), and may store the determined requests in an object. The object may include a number of the determined requests and a current time and a start time associated with the determined requests. The cache server may determine whether the number of the determined requests satisfies a first threshold (e.g., for a maximum number of outstanding requests that may be sent to the origin device). The cache server may also determine whether a difference between the current time and the start time satisfies a second threshold (e.g., for a length of time to wait for a response from the origin device).

If the cache server determines that the number of the determined requests satisfies the first threshold and that the difference satisfies the second threshold, the cache server may identify the loop caused by the incorrectly configured origin device. The cache server may prevent requests from being provided to the origin device, may queue the determined requests, and/or may generate an alert. The alert may indicate that the origin device is incorrectly configured to point to the cache server.

Such an arrangement may detect and/or prevent transaction loops in a cache server due to an incorrectly configured origin device. Detection of the loop may prevent a buildup of outstanding requests at the cache server, which may prevent a service disruption due to resource exhaustion in the cache server.

User interfaces, as described herein, may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a device (e.g., via a touch screen display, a mouse, a keyboard, a keypad, voice commands, etc.).

Figure 2:
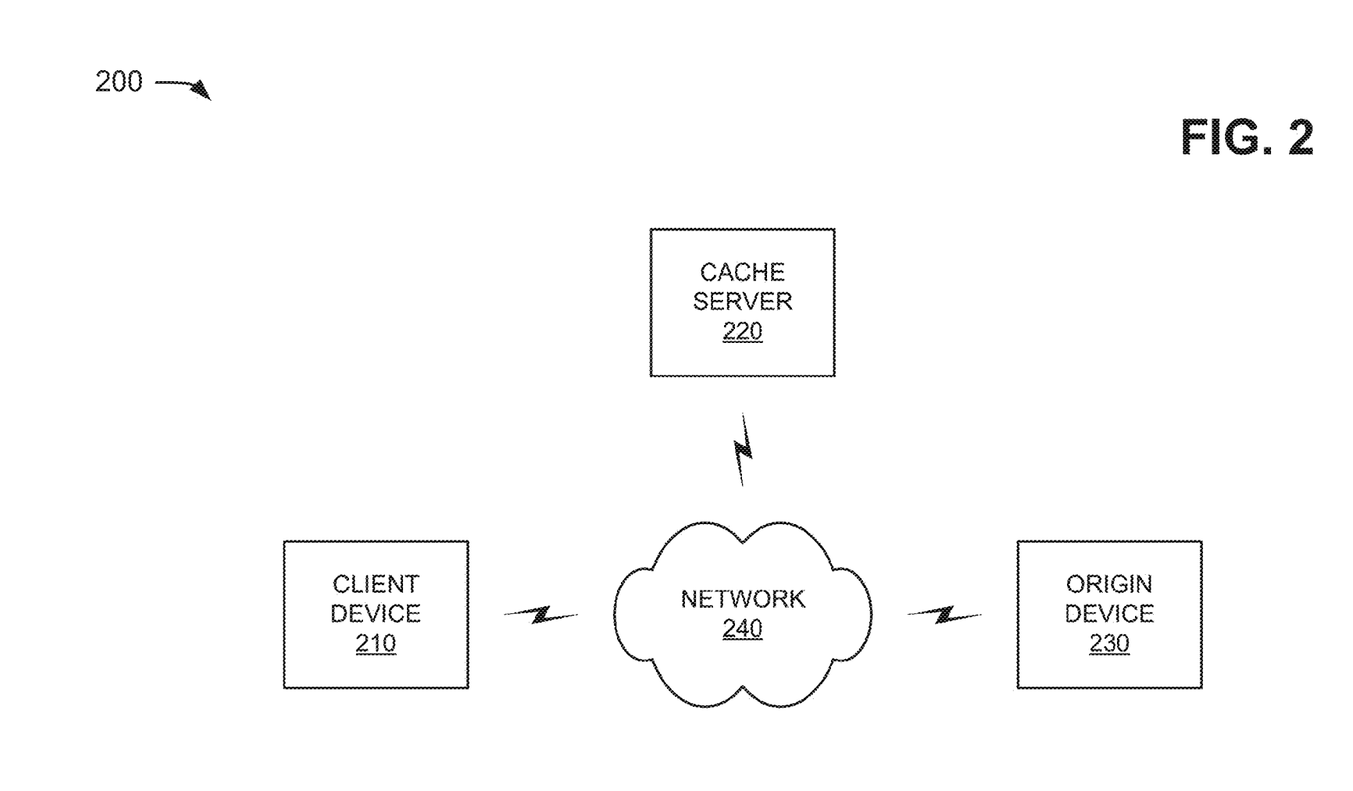
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210, a cache server device 220 (referred to herein as "cache server 220"), an origin device 230, and a network 240. Components of environment 200 may interconnect via wired connections, wireless connections, or a combination of wired and wireless connections.

Client device 210 may include any device that is capable of accessing cache server 220 and/or origin device 230 via network 240. For example, client device 210 may include a laptop computer, a personal computer, a tablet computer, a desktop computer, a workstation computer, a smart phone, a personal digital assistant (PDA), and/or other computation and communication devices.

Cache server 220 may include one or more server devices, or other types of computation and communication devices. In some implementations, cache server 220 may act as an intermediary for requests from client device 210 seeking content (e.g., video, audio, images, text, software downloads, etc.) from origin device 230. Client device 210 may connect to cache server 220, and may request some content available from origin device 230. Cache server 220 may provide the requested content by connecting to origin device 230 and requesting the content on behalf of client device 210.

Origin device 230 may include one or more server devices, or other types of computation and communication devices. In some implementations, origin device 230 may include content that may be accessed by client device 210 via network 240. Origin device 230 may provide content to client device 210, via network 240, or may provide particular content to cache server 220 for storage. Cache server 220 may store the particular content so that cache server 220 may provide the particular content to client device 210, when requested by client device 210.

Network 240 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Figure 3:
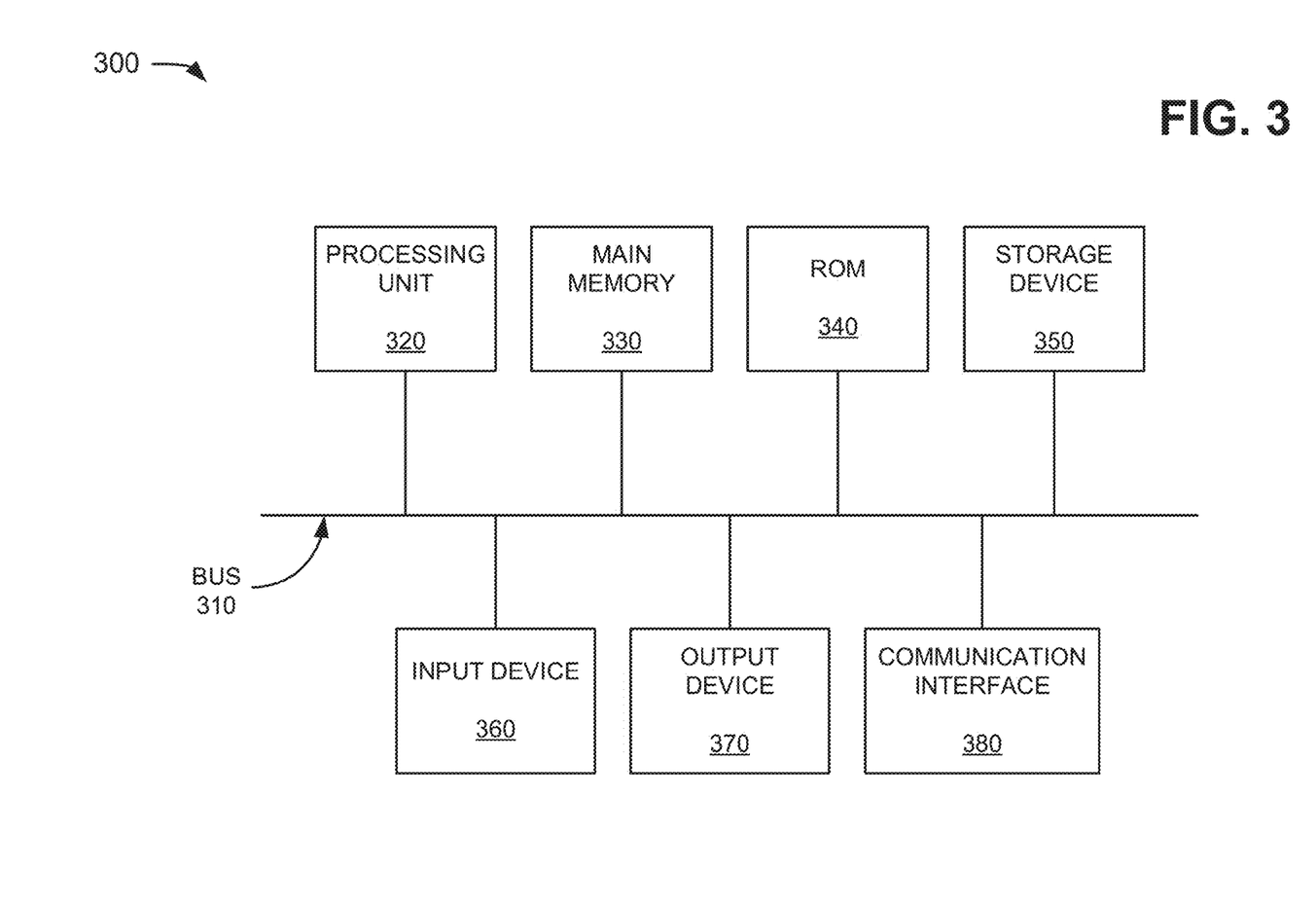
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
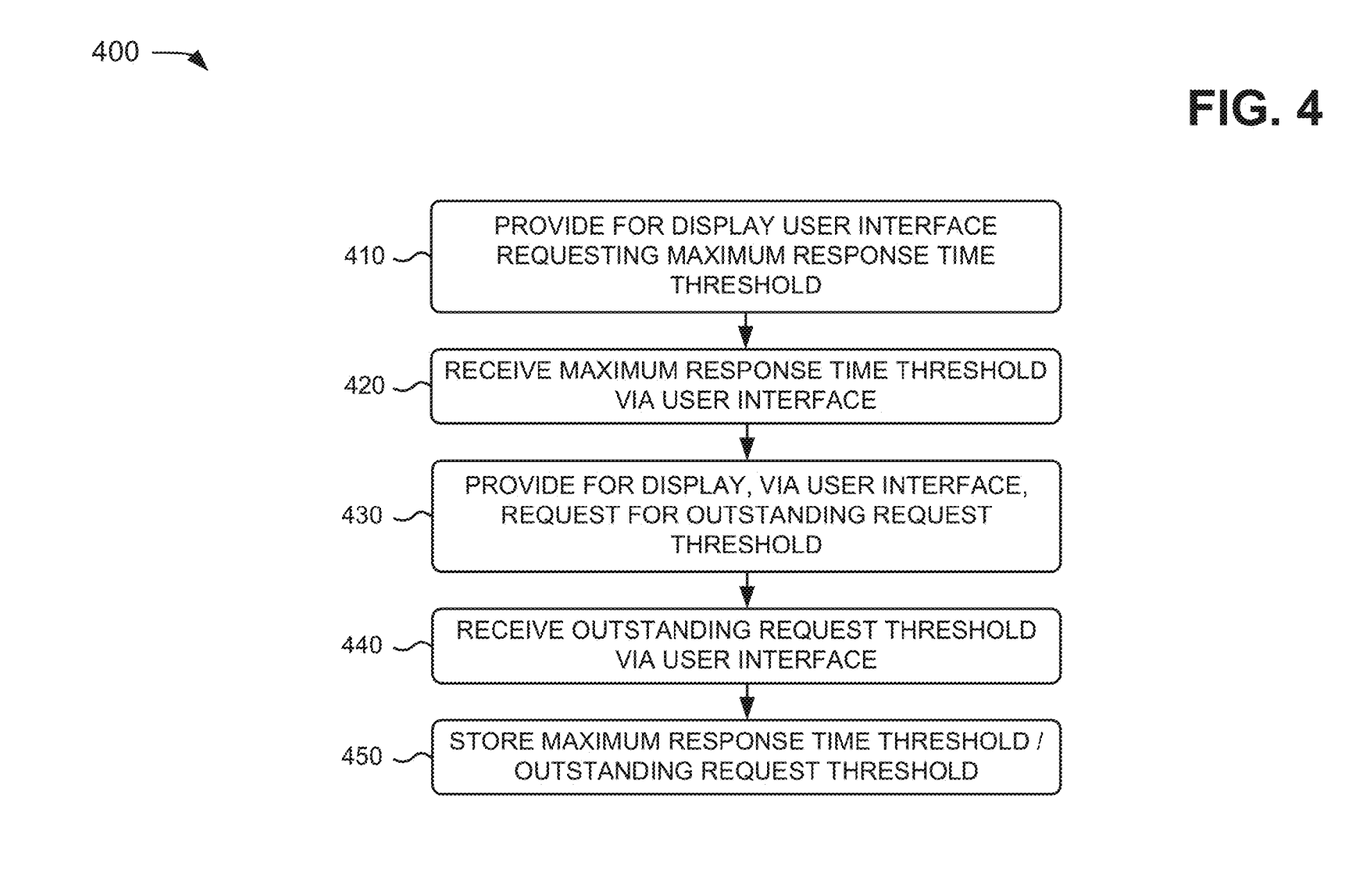
FIG. 4 is a flow chart of an example process for receiving configuration settings for transaction loop detection and prevention associated with a cache server.

FIG. 4 is a flow chart of an example process 400 for receiving configuration settings for transaction loop detection and prevention associated with a cache server. In some implementations, process 400 may be performed by cache server 220. In some implementations, process 400 may be performed by another device or a group of devices separate from or including cache server 220.

As shown in FIG. 4, process 400 may include providing for display a user interface requesting a maximum response time threshold (block 410). For example, cache server 220 may provide for display a user interface that requests a maximum response time threshold. The maximum response time threshold may include a length of time for cache server 220 to wait for a response from origin device 230 (e.g., a response to a request sent from cache server 220 to origin device 230). In some implementations, cache server 220 may provide the user interface for display to a user of cache server 220, may provide the user interface for display to another device associated with the user and with access to cache server 220, etc.

As further shown in FIG. 4, process 400 may include receiving the maximum response time threshold via the user interface (block 420). For example, the user may utilize the user interface to input the maximum response time threshold, via cache server 220 or via the other device with access to cache server 220. Cache server 220 may receive the maximum response time threshold. In some implementations, the maximum response time threshold may depend on resources (e.g., processing resources, memory resources, etc.) available at cache server 220, and cache server 220 may adjust the maximum response time threshold based on the resource availability. For example, cache server 220 may decrease the maximum response time threshold as the resource availability decreases.

Returning to FIG. 4, process 400 may include providing for display, via the user interface, a request for an outstanding request threshold (block 430). For example, cache server 220 may provide for display, via the user interface, a request for an outstanding request threshold. The outstanding request threshold may include a maximum number of outstanding requests that may be sent by cache server 220 to origin device 230. In some implementations, cache server 220 may provide the user interface for display to the user of cache server 220, may provide the user interface for display to the other device with access to cache server 220, etc.

As further shown in FIG. 4, process 400 may include receiving the outstanding request threshold via the user interface (block 440). For example, the user may utilize the user interface to input the outstanding request threshold, via cache server 220 or via the other device with access to cache server 220. Cache server 220 may receive the outstanding request threshold. In some implementations, the outstanding request threshold may depend on resources available at cache server 220, and cache server 220 may adjust the outstanding request threshold based on the resource availability. For example, cache server 220 may decrease the outstanding request threshold as the resource availability decreases.

Returning to FIG. 4, process 400 may include storing the maximum response time threshold and the outstanding request threshold (block 450). For example, cache server 220 may store the maximum response time threshold and the outstanding request threshold in memory (e.g., in main memory 330, ROM 340, and/or storage device 350, FIG. 3). Cache server 220 may utilize the maximum response time threshold and the outstanding request threshold for detecting and preventing transaction loops in cache server 220 due to an incorrectly configured origin device 230, as described below.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Figure 5A:
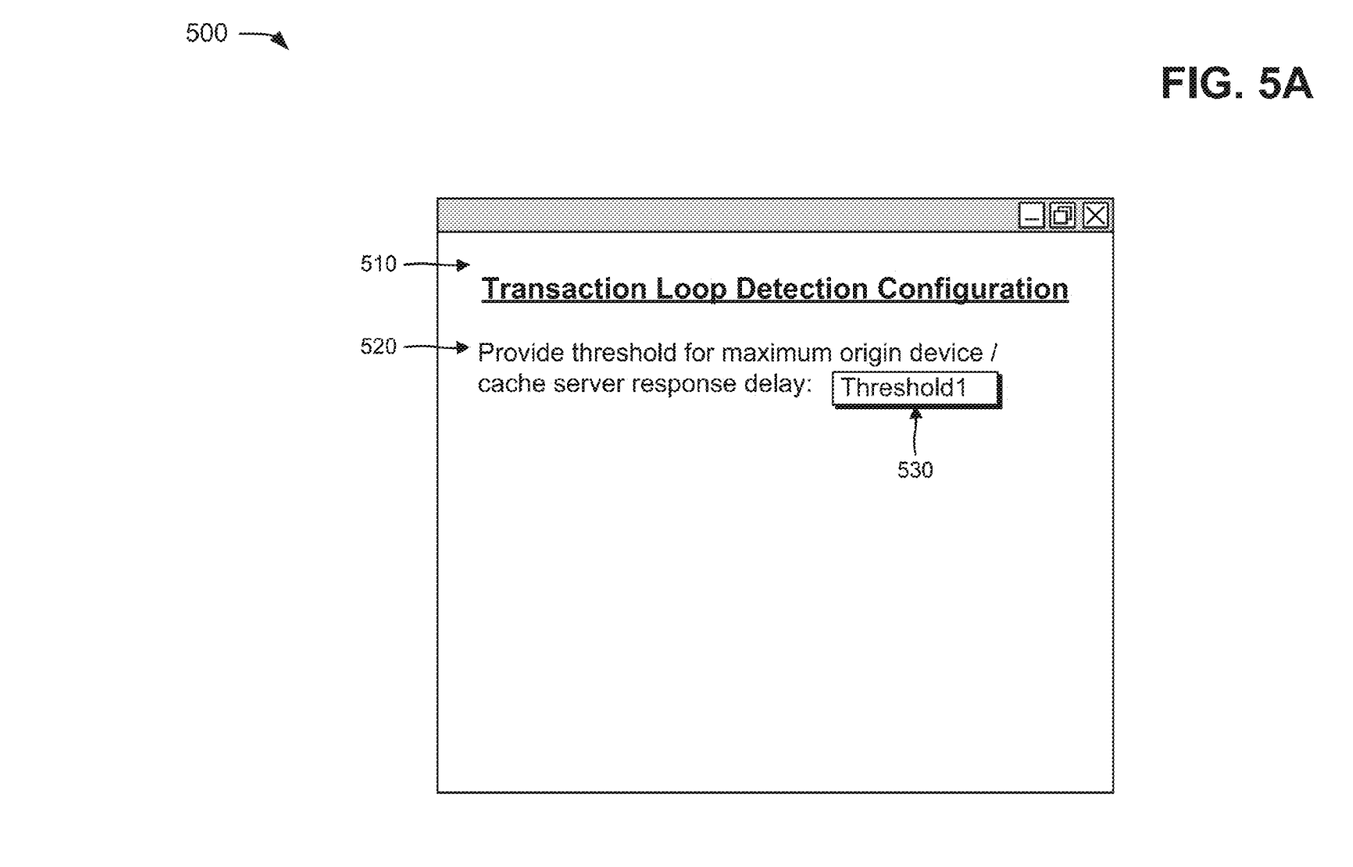
FIGS. 5A and 5B are diagrams of an example of the process described above with respect to FIG. 4.
Figure 5B:
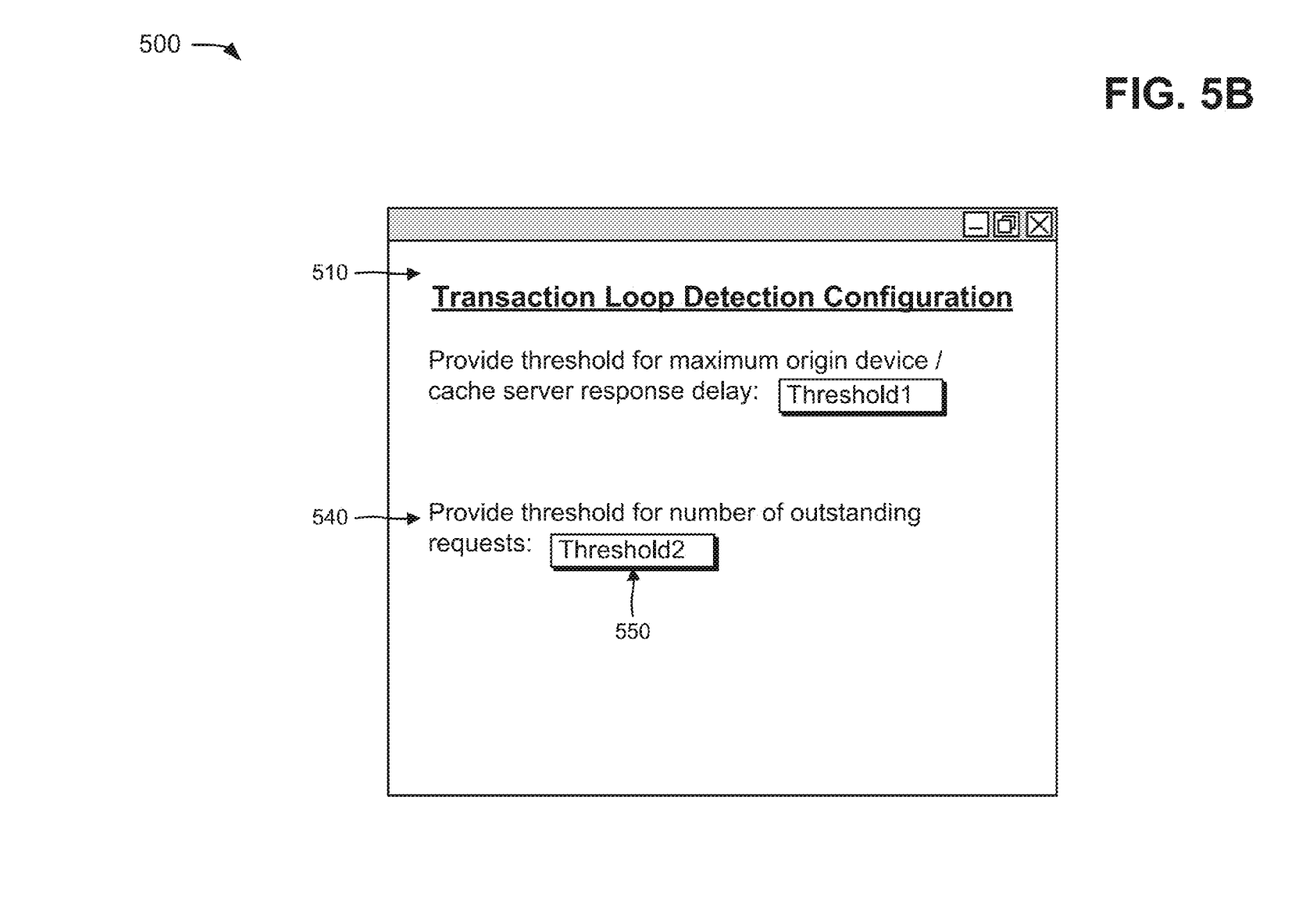

FIGS. 5A and 5B are diagrams of an example 500 of the process described above with respect to FIG. 4. In example 500, assume that cache server 220 provides a user interface 510 for display to a user, as shown in FIG. 5A. User interface 510 may include, for example, information used to define configuration parameters that enable cache server 220 to detect and prevent transaction loops in cache server 220 due to an incorrectly configured origin device 230. As further shown in FIG. 5A, user interface 510 may provide information 520 instructing the user to provide a threshold for a maximum response delay associated with cache server 220 and origin device 230. The threshold may be referred to as a maximum response time threshold, and may include a length of time for cache server 220 to wait for a response from origin device 230 (e.g., a response to a request sent from cache server 220 to origin device 230).

As further shown in FIG. 5A, the user may provide the maximum response time threshold (e.g. "Threshold1") in a mechanism 530 (e.g., a window, a menu, etc.) provided by user interface 510. In some implementations, mechanism 530 may provide a list of maximum response time thresholds, and the user may select the maximum response time threshold from the list. Cache server 220 may receive the maximum response time threshold, and may store the maximum response time threshold in memory.

As shown in FIG. 5B, user interface 510 may provide information 540 instructing the user to provide a threshold for a number of outstanding requests. The threshold may be referred to as an outstanding request threshold, and may include a maximum number of outstanding requests that may be sent by cache server 220 to origin device 230. As further shown in FIG. 5B, the user may provide the outstanding request threshold (e.g. "Threshold2") in a mechanism 550 (e.g., a window, a menu, etc.) provided by user interface 510. In some implementations, mechanism 550 may provide a list of outstanding request thresholds, and the user may select the outstanding request threshold from the list. Cache server 220 may receive the outstanding request threshold, and may store the outstanding request threshold in memory.

Figure 6:
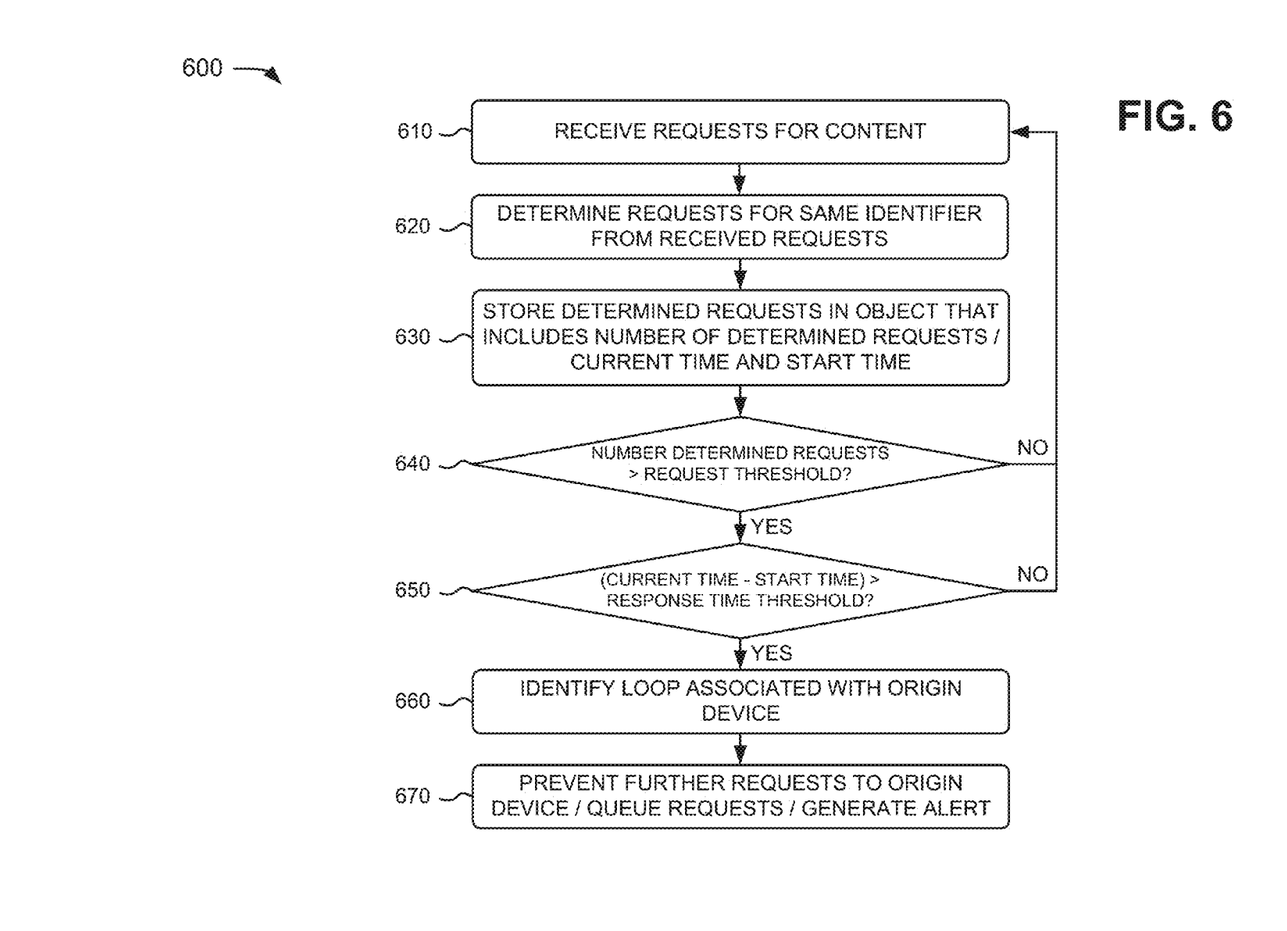
FIG. 6 is a flow chart of an example process for detecting and preventing a transaction loop associated with a cache server.

FIG. 6 is a flow chart of an example process 600 for detecting and preventing a transaction loop associated with a cache server. In some implementations, process 600 may be performed by cache server 220. In some implementations, process 600 may be performed by another device or a group of devices separate from or including cache server 220.

As shown in FIG. 6, process 600 may include receiving requests for content (block 610). For example, client device 210 and/or other client devices may generate requests for content, and may provide the requests for content to cache server 220. Cache server 220 may receive the requests, and may determine whether the requested content is stored in cache server 220. If a request is for content that is stored in cache server 220, then cache server 220 may provide the content to client device 210. If the requested content is not stored in cache server 220, then cache server 220 may connect to origin device 230 and may request the content from origin device 230. Cache server 220 may provide the content returned by origin device 230 to client device 210, and may cache the content for future use.

In some implementations, if origin device 230 is incorrectly configured to point to cache server 220, a request for content stored in origin device 230 may create a loop between cache server 220 and origin device 230. The loop may cause the request to be received several times by cache server 220.

As further shown in FIG. 6, process 600 may include determining requests for a same identifier from the received requests (block 620). For example, cache server 220 may determine requests for a same identifier (e.g., a HTTP URL) from the received requests for content. In some implementations, cache server 220 may compare identifiers associated with the received requests, and may identify requests with the same identifier based on the comparison. For example, if cache server 220 receives, from client device 210, a request for a video stored at a particular URL (e.g., stored in origin device 230), cache server 220 may provide the video request to origin device 230. However, if a transaction loop is present between cache server 220 and origin device 230, origin device 230 may return the video request to cache server 220. The returned video request may include the particular URL as the video request received from client device 210. The loop may cause cache server 220 to receive the video request several times until resources of cache server 220 are exhausted. In such a scenario, cache server 220 may determine the video requests to be requests for the same identifier.

Returning to FIG. 6, process 600 may include storing the determined requests in an object that includes a number of the determined requests and a current time and a start time associated with the determined requests (block 630). For example, cache server 220 may store information associated the requests determined to have to the same identifier in a single object. The single object may keep track of a number of the determined requests (e.g., outstanding requests not served by origin device 230) and a current time and a start time associated with the determined requests. In some implementations, when a request first arrives at cache server 220, cache server 220 may set the start time to zero (0). In some implementations, when a valid response (e.g., not a timeout) to a request is received from origin device 230, cache server 220 may reset the start time to zero (0). Cache server 220 may not reset the start time to zero (0) when a timeout is received from origin device 230. When a timeout is received from origin device 230, cache server 220 may provide for display an error message that provides information associated with the timeout, pending requests at cache server 220, etc.

In some implementations, an object may be identified by a unique object descriptor that includes details about the object. For example, the object descriptor may include a "current" field that keeps track of the current time, a "start" field that keeps track of the start time, a "requests" field that keeps track of the number of the determined requests, and a "pending requests" field that keeps track of a total number of pending requests associated with cache server 220. Cache server 220 may utilize the "current," "start," and "requests" fields to detect a transaction loop, and may utilize the "pending requests" field to prevent a transaction loop.

In some implementations, if two objects include a same request name but different content, then each of the two objects may have a different object descriptor. When a request for content is received by cache server 220, cache server 220 may perform an object descriptor lookup for the request. If an object descriptor for the request is not stored in cache server 220, cache server 220 may create a new object descriptor for the request. Cache server 220 may send a modified request to origin device 230 (e.g., if the content is partially stored in cache server 220) or may send the request to origin device 230 (e.g., if the content is not stored in cache server 220).

As further shown in FIG. 6, process 600 may include determining whether the number of the determined requests satisfies an outstanding request threshold (block 640). If the number of the determined requests does not satisfy the outstanding request threshold (block 640—NO), process 600 may return to block 610. For example, when a new request is received, cache server 220 may determine whether the number of the determined requests, stored in the object, satisfies (e.g., is greater than) the outstanding request threshold described above in connection with FIGS. 4-5B. If the number of the determined requests does not satisfy the outstanding request threshold, cache server 220 may continue to receive and evaluate requests for content.

Returning to FIG. 6, if the number of the determined requests satisfies the outstanding request threshold (block 640—YES), process 600 may include determining whether a difference between the current time and the start time satisfies a maximum response time threshold (block 650). If the difference does not satisfy the maximum response time threshold (block 650—NO), process 600 may return to block 610. For example, cache server 220 may determine whether the difference between the current time and the start time, stored in the object, satisfies (e.g., is greater than) the maximum response time threshold described above in connection with FIGS. 4-5B. If the difference does not satisfy the maximum response time threshold, cache server 220 may continue to receive and evaluate requests for content.

As further shown in FIG. 6, if the difference satisfies the maximum response time threshold (block 650—YES), process 600 may include identifying a loop associated with the origin device (block 660). For example, if cache server 220 determines that the number of the determined requests satisfies the outstanding request threshold and that the difference satisfies the maximum response time threshold, cache server 220 may identify a loop issue associated with origin device 230. In some implementations, the loop issue may include origin device 230 being incorrectly configured to point to cache server 220, and a buildup of outstanding requests at cache server 220.

Returning to FIG. 6, process 600 may include preventing further requests from being provided to the origin device, queuing the determined requests, and/or generating an alert (block 670). For example, cache server 220 may prevent further requests from going to origin device 230, may queue the determined requests, and/or may generate an alert message. In some implementations, cache server 220 may prevent further requests from being sent to origin device 230 until a valid response is received from origin device 230. In some implementations, cache server 220 may queue the determined requests in order to prevent the loop issue. In some implementations, cache server 220 may provide for display an alert or error message that indicates that origin device 230 is incorrectly configured to point to cache server 220, includes information associated with the queued requests, etc.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
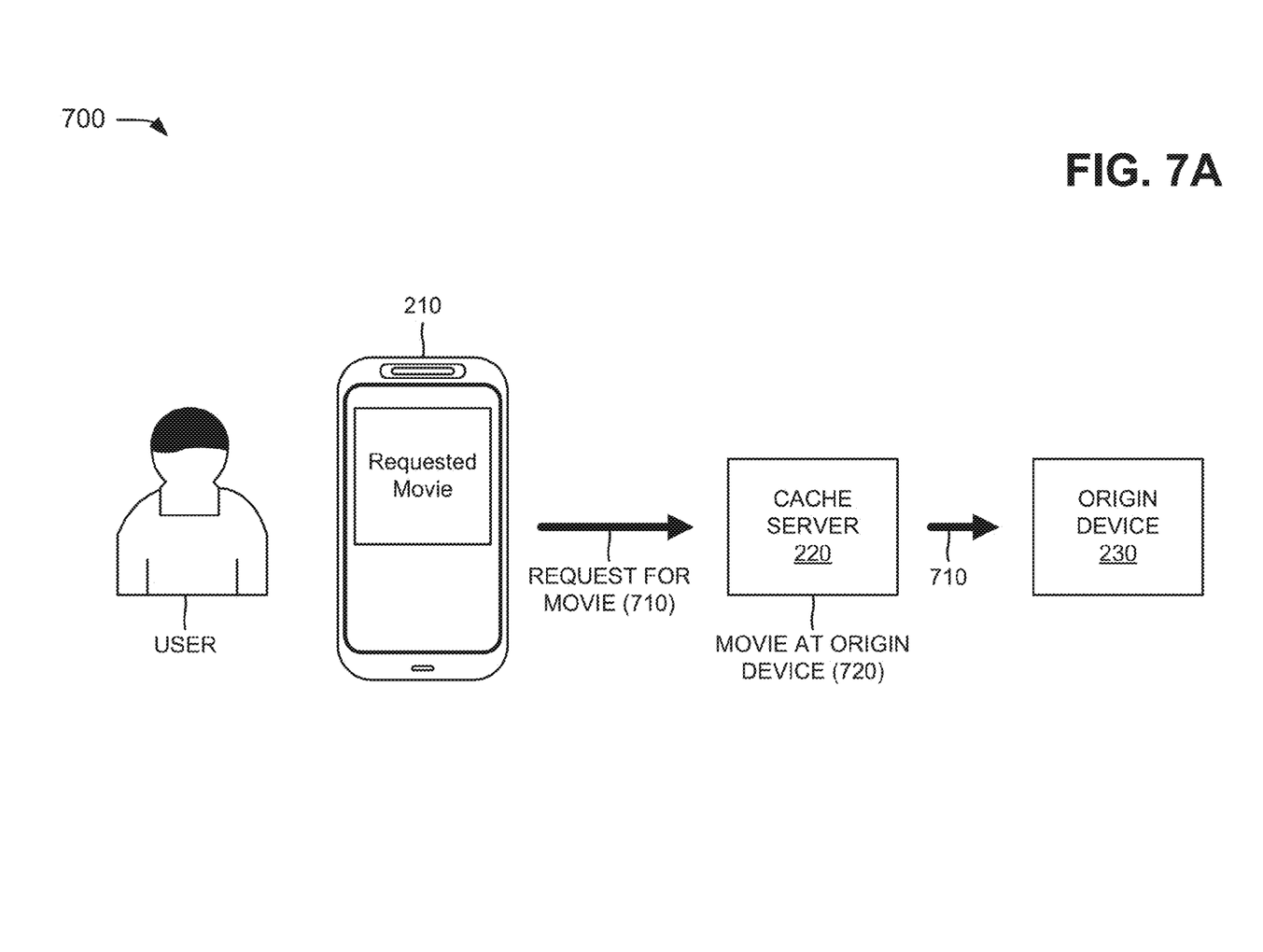
FIGS. 7A-7E are diagrams of an example of the process described above with respect to FIG. 6.

FIGS. 7A-7E are diagrams of an example 700 of the process described above with respect to FIG. 6. In the example 700, assume that a user associated with client device 210 wishes to view a movie via client device 210. Further assume that the movie is associated with an identifier (e.g., http://yyy.com/movie), and that client device 210 generates a request 710 for the movie. As shown in FIG. 7A, client device 210 may provide request 710 to cache server 220. Cache server 220 may receive request 710, and may determine whether the requested movie is stored in cache server 220. In example 700, assume that the requested movie is not stored in cache server 220, but is stored in origin device 230, as indicated by reference number 720. As further shown in FIG. 7A, cache server 220 may forward request 710 to origin device 230 so that client device 210 may receive the requested movie.

Figure 7B:
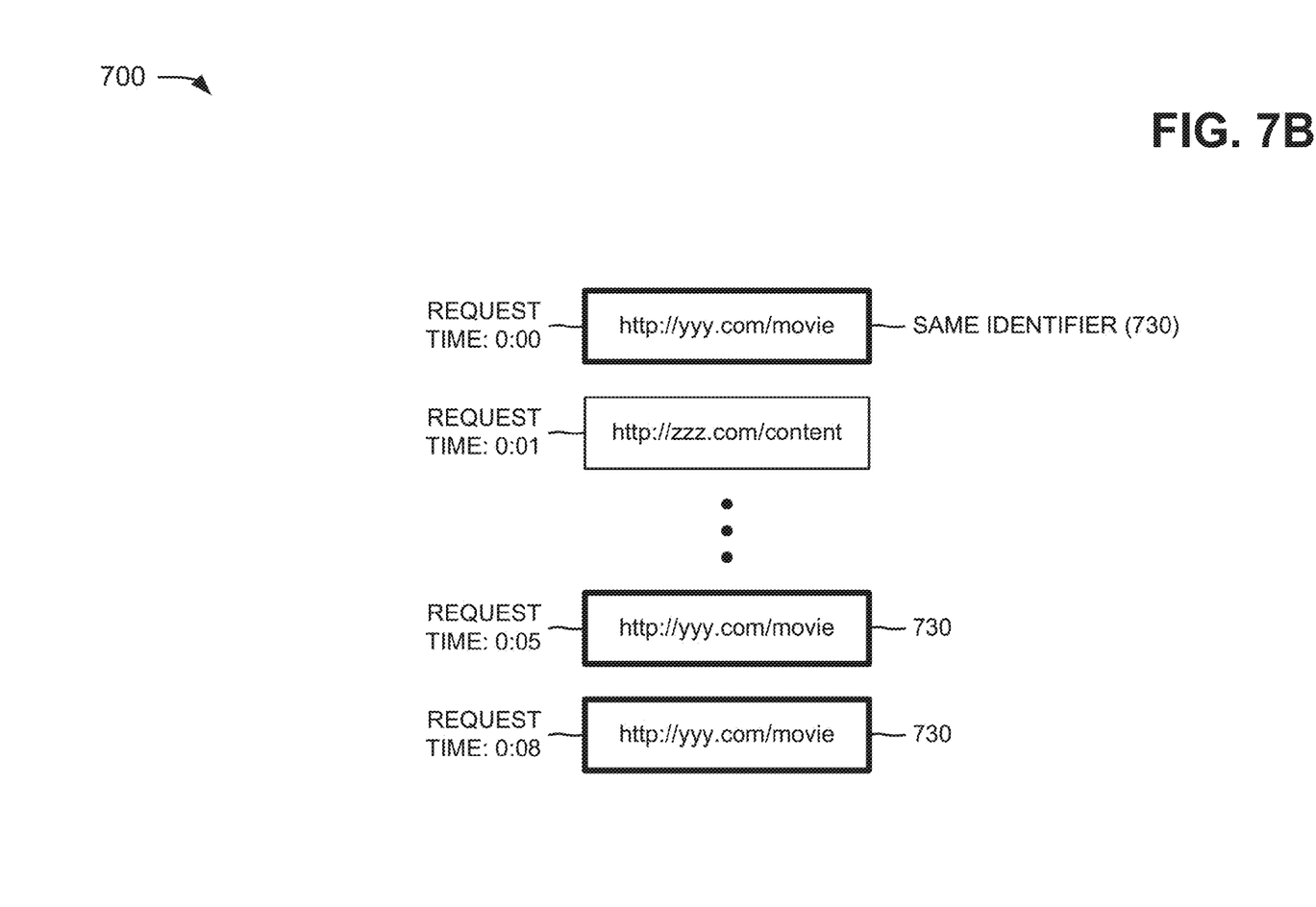

In example 700, further assume that origin device 230 is incorrectly configured to point to cache server 220 so that cache server 220 receives request 710 multiple times from origin device 230 (e.g., due to a loop issue). As shown in FIG. 7B, cache server 220 may receive a request for the movie (e.g., with the identifier http://yyy.com/movie) multiple times, and may receive other requests for content (e.g., with an identifier http://zzz.com/content). A first request may be received at a first time (e.g., 0:00 seconds, minutes, etc.), a second request may be received at a second time (e.g., 0:01), a third request may be received at a third time (e.g., 0:05), and a fourth request may be received at a fourth time (e.g., 0:08).

Cache server 220 may compare the identifiers associated with the received requests, and may identify requests with the same identifier based on the comparison. For example, as shown in FIG. 7B, cache server 220 may determine that the first, third, and fourth requests include a same identifier 730 (e.g., http://yyy.com/movie). Cache server 220 may determine that the second request includes a different identifier (e.g., http://zzz.com/content).

Figure 7C:
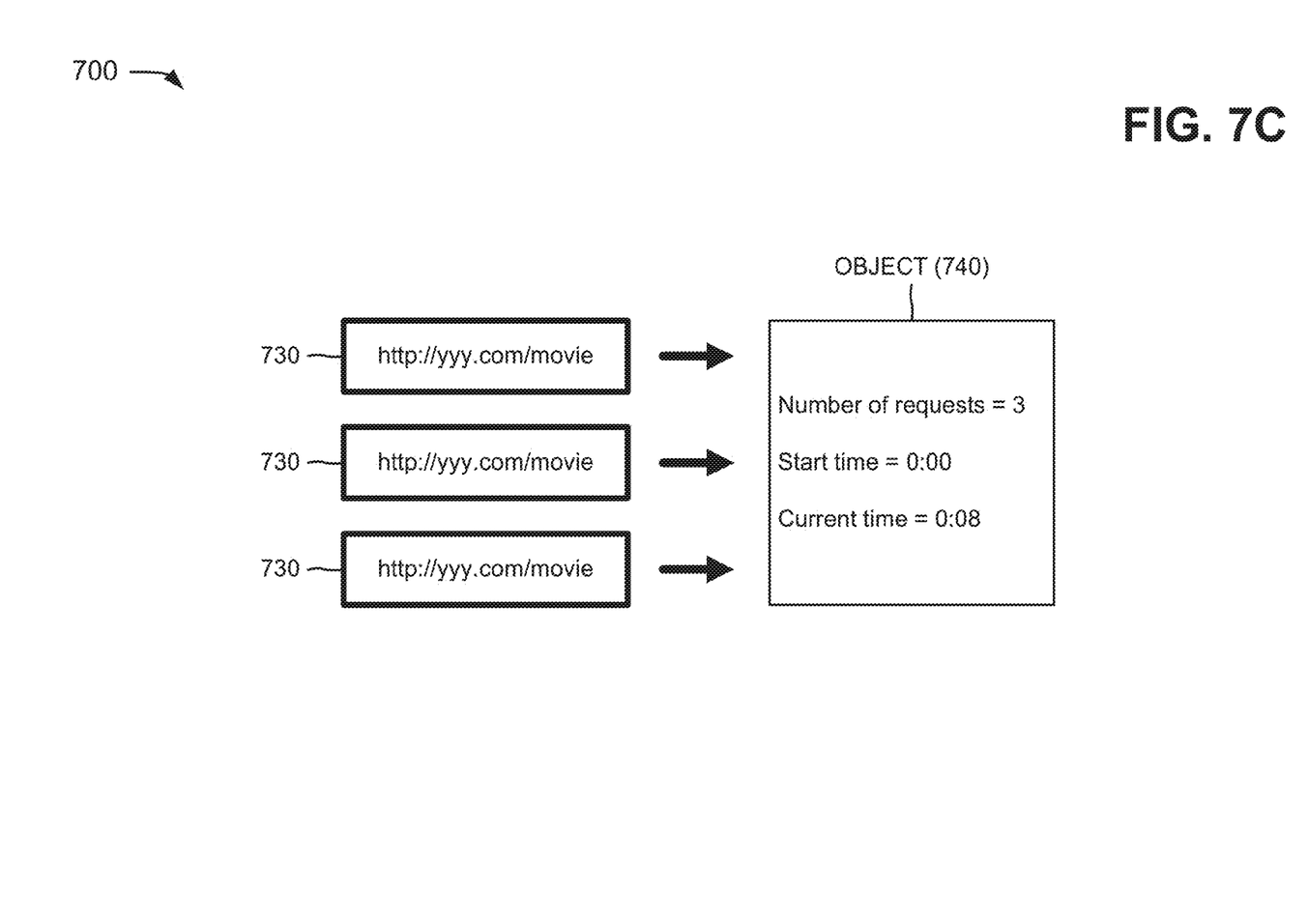

As shown in FIG. 7C, cache server 220 may store information associated the requests determined to have same identifier 730 in a single object 740. Object 740 may keep track of a number of requests with same identifier 730 (e.g., three), a current time (e.g., 0:08) associated with the requests with same identifier 730, and a start time (e.g., 0:00) associated with the requests with same identifier 730. In some implementations, object 740 may be associated with an object descriptor that includes a "current" field that keeps track of the current time (e.g., 0:08), a "start" field that keeps track of the start time (e.g., 0:00), a "requests" field that keeps track of the number of requests (e.g., three), and a "pending requests" field that keeps track of a total number of pending requests (e.g., four) associated with cache server 220. Cache server 220 may store object 740 in memory (e.g., in main memory 330, ROM 340, and/or storage device 350, FIG. 3).

Figure 7D:
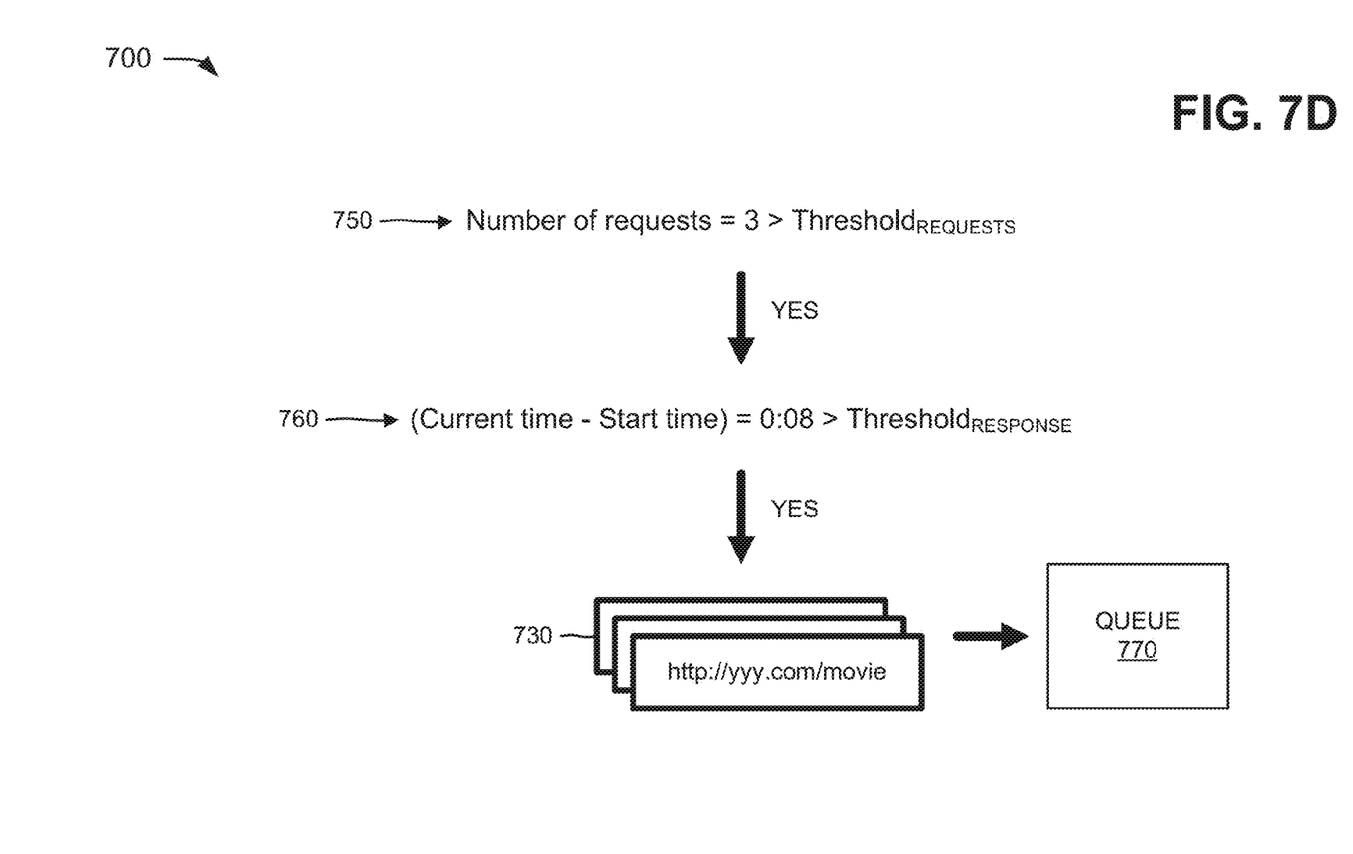

As shown in FIG. 7D, cache server 220 may determine whether the number of the determined requests (e.g., three), stored in object 740, is greater than an outstanding request threshold (e.g., $Threshold_{REQUESTS}$), as indicated by reference number 750. In example 700, assume that the $Threshold_{REQUESTS}$ is set to two (e.g., by a user, as described above) so that the number of the determined requests (e.g., three) is greater than the $Threshold_{REQUESTS}$. As further shown in FIG. 7D, cache server 220 may determine whether a difference between the current time (e.g., 0:08) and the start time (e.g., 0:00), stored in object 740, is greater than a maximum response time threshold (e.g., $Threshold_{RESPONSE}$), as indicated by reference number 760. In example 700, assume that the $Threshold_{RESPONSE}$ is set to 0:06 (e.g., by a user, as described above) so that the difference (e.g., 0:08) is greater than the $Threshold_{RESPONSE}$.

Since cache server 220 determines that the number of the determined requests satisfies the $Threshold_{REQUESTS}$ and that the difference satisfies the $Threshold_{RESPONSE}$, cache server 220 may identify a loop issue associated with origin device 230. Cache server 220 may prevent further requests from going to origin device 230, and may provide the determined requests to a queue 770, as further shown in FIG. 7D. Queue 770 may include a data structure provided in memory associated with cache server 220. In some implementations, cache server 220 may provide the determined requests to queue 770 in order to prevent the loop issue.

Figure 7E:
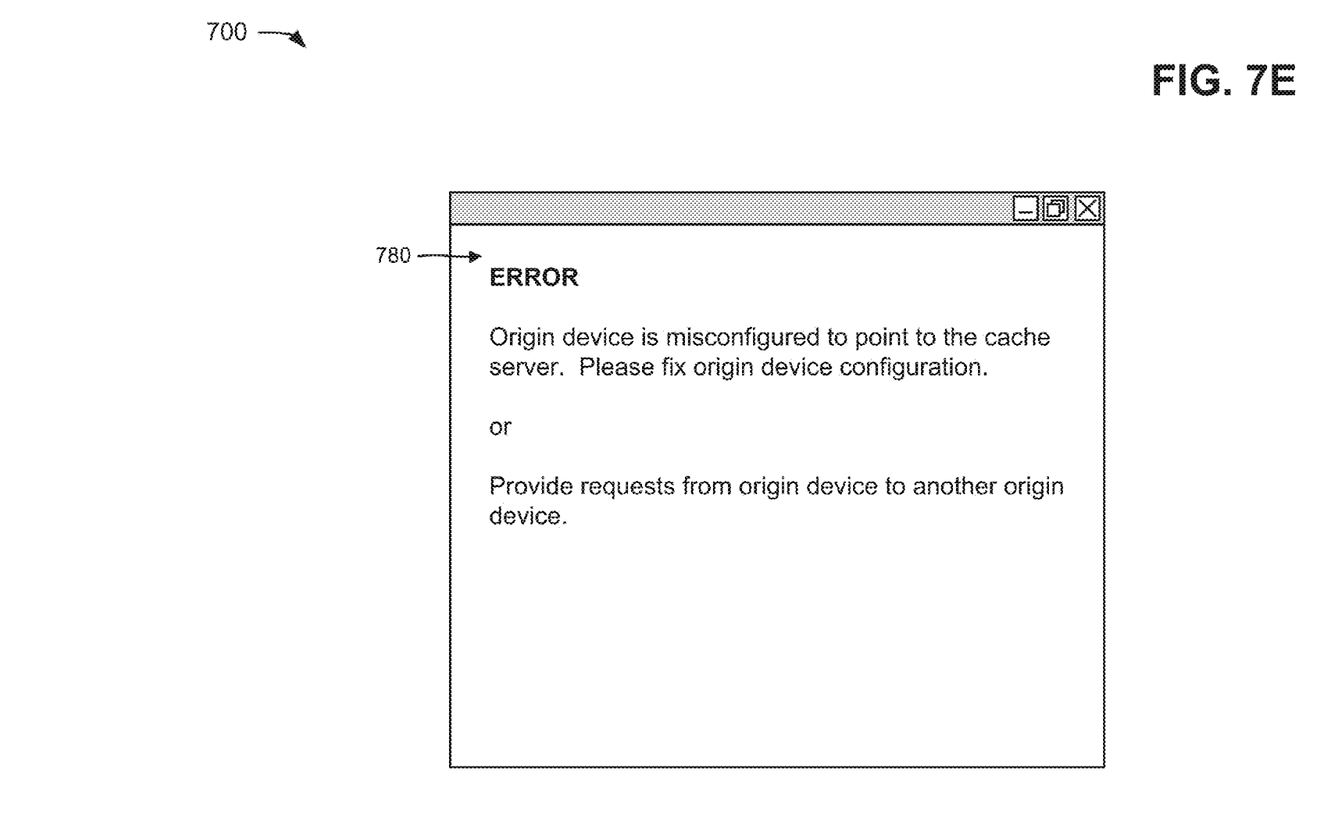

In example 700, further assume that identification of the loop causes cache server 220 to generate an error message user interface 780, as shown in FIG. 7E. User interface 780 may display an alert or error message that indicates that origin device 230 is incorrectly configured to point to cache server 220 and that instructs the user to fix the configuration of origin device 230. In some implementations, user interface 780 may display information associated with the queued or outstanding requests at cache server 220. In some implementations, user interface 780 may display information recommending that cache server 220 provide the queued requests to another origin device 230.

Systems and/or methods described herein may detect and/or prevent transaction loops in a cache server due to an incorrectly configured origin device. The origin device may be incorrectly configured, to point to the cache server, by a DNS, a load balancer, network topology, etc. of a network associated with the origin device and the cache server. The systems and/or methods may determine requests for the same identifier (e.g., a HTTP URL), and may store the determined requests in a single object. The systems and/or methods may detect and/or prevent a transaction loop when a number of the determined requests is greater than a threshold and when a response time, associated with the determined requests, is greater than another threshold.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a device, a plurality of requests,
      the device being a cache server;
   determining, by the device and from the plurality of the requests, particular requests, for particular content, that include a same identifier associated with the particular content,
      the particular content including a video, an image, text, or software;
   storing, by the device, information associated with the particular requests in an object,
      the object including:
         a number of the particular requests, and
         a current time and a start time associated with the particular requests;
   determining, by the device, whether the number of the particular requests satisfies a first threshold,
      the first threshold being a quantity of requests;
   determining, by the device, whether a difference between the current time and the start time satisfies a second threshold,
      the second threshold being a length of time;
   identifying, by the device, a loop between the cache server and an origin device when the number of the particular requests satisfies the first threshold and when the difference satisfies the second threshold,
      the origin device providing the particular content to the cache server or a client device, based on one of the particular requests, when the origin device is correctly configured,
      the origin device providing the one of the particular requests to the cache server when the origin device is incorrectly configured, and
      the loop being caused by the origin device sending the one of the particular requests to the cache server; and
   providing, by the device, information associated with the loop.

2. The method of claim 1, further comprising:
   preventing additional requests for the particular content from being provided to the origin device.

3. The method of claim 1, further comprising:
   providing the particular requests in a queue; and
   generating an error message that provides the information associated with the loop.

4. The method of claim 1, further comprising:
   receiving additional requests for the particular content when at least one of the number of the particular requests fails to satisfy the first threshold or the difference fails to satisfy the second threshold.

5. The method of claim 1, further comprising:
   providing, for display, a user interface that requests the first threshold and the second threshold;
   receiving the first threshold and the second threshold via the user interface; and
   storing the first threshold and the second threshold.

6. The method of claim 1, where the quantity of requests includes a maximum number of outstanding requests to be sent by the device to the origin device.

7. The method of claim 1, where the length of time includes a time for the cache server to wait for a response from the origin device.

8. A device, comprising:
   a memory; and
   one or more processors to:
      receive a plurality of requests,
      determine, from the plurality of the requests, particular requests, for particular content, that include a same identifier associated with the particular content,
         the particular content including a video, an image, text, or software,
      store information associated with the particular requests in an object,
         the object including:
            a number of the particular requests, and
            a current time and a start time associated with the particular requests,
      determine whether the number of the particular requests satisfies a first threshold,
         the first threshold being a quantity of requests,
      determine whether a difference between the current time and the start time satisfies a second threshold,
         the second threshold being a length of time,
      identify a loop between a cache server and an origin device when the number of the particular requests satisfies the first threshold and when the difference satisfies the second threshold,
         the device being the cache server,
         the origin device providing the particular content to the cache server or a client device, based on one of the particular requests, when the origin device is correctly configured,
         the origin device providing the one of the particular requests to the cache server when the origin device is incorrectly configured, and
         the loop being caused by the origin device sending the one of the particular requests to the cache server, and
      provide information associated with the identified loop.

9. The device of claim 8, where the one or more processors are further to:
   prevent additional requests for the particular content from being provided to the origin device.

10. The device of claim 8, where the one or more processors are further to:
provide the particular requests in a queue, and
generate an error message that provides the information associated with the loop.

11. The device of claim 8, where the one or more processors are further to:
receive additional requests for the particular content when at least one of the number of the particular requests fails to satisfy the first threshold or the difference fails to satisfy the second threshold.

12. The device of claim 8, where the one or more processors are further to:
provide, for display, a user interface that requests the first threshold and the second threshold,
receive the first threshold and the second threshold via the user interface, and
store the first threshold and the second threshold.

13. The device of claim 8, where the quantity of requests includes a maximum number of outstanding requests to be sent by the device to the origin device.

14. The device of claim 8, where the length of time includes a time for the cache server to wait for a response from the origin device.

15. A non-transitory computer-readable medium for storing instructions, the instructions comprising:
one or more instructions that, when executed by a processor of a cache server, cause the processor to:
receive a plurality of requests,
determine, from the plurality of the requests, particular requests, for particular content, that include a same identifier associated with particular content,
the particular content including a video, an image, text, or software,
store information associated with the particular requests in an object, the object including:
a number of the particular requests, and
a current time and a start time associated with the particular requests,
determine whether the number of the particular requests satisfies a first threshold,
the first threshold being a quantity of requests,
determine whether a difference between the current time and the start time satisfies a second threshold,
the second threshold including a length of time,
identify a loop between the cache server and an origin device when the number of the particular requests satisfies the first threshold and when the difference satisfies the second threshold,
the origin device providing the particular content to the cache server or a client device, based on one of the particular requests, when the origin device is correctly configured,
the origin device providing the one of the particular requests to the cache server when the origin device is incorrectly configured, and
the loop being identified when the origin device is incorrectly configured, and
provide information associated with the identified loop.

16. The non-transitory computer-readable medium of claim 15, further comprising:
one or more instructions that, when executed by the processor, cause the processor to:
prevent additional requests for the particular content from being provided to the origin device.

17. The non-transitory computer-readable medium of claim 15, further comprising:
one or more instructions that, when executed by the processor, cause the processor to:
provide the particular requests in a queue, and
generate an error message that provides the information associated with the loop.

18. The non-transitory computer-readable medium of claim 15, further comprising:
one or more instructions that, when executed by the processor, cause the processor to:
receive additional requests for the particular content when at least one of the number of the particular requests fails to satisfy the first threshold or the difference fails to satisfy the second threshold.

19. The non-transitory computer-readable medium of claim 15, further comprising:
one or more instructions that, when executed by the processor, cause the processor to:
provide, for display, a user interface that requests the first threshold and the second threshold,
receive the first threshold and the second threshold via the user interface, and
store the first threshold and the second threshold.

20. The non-transitory computer-readable medium of claim 15, where:
the quantity of requests includes a maximum number of outstanding requests to be sent by the cache server to the origin device, and
the length of time includes a time for the cache server to wait for a response from the origin device.

\* \* \* \* \*